United States Patent [19]

Abe et al.

[11] Patent Number: 5,151,492

[45] Date of Patent: Sep. 29, 1992

[54] PROCESS FOR PRODUCING PEROXIDE-VULCANIZABLE, FLUORINE-CONTAINING ELASTOMER

[75] Inventors: Masatoshi Abe, Kashima; Haruyoshi Tatsu, Hitachi, both of Japan

[73] Assignee: Nippon Mektron, Limited, Tokyo, Japan

[21] Appl. No.: 824,084

[22] Filed: Jan. 22, 1992

[30] Foreign Application Priority Data

Mar. 15, 1991 [JP] Japan ................................. 3-75793

[51] Int. Cl.$^5$ ................................................ C08F 2/38
[52] U.S. Cl. ...................................... 526/206; 526/254
[58] Field of Search ................................. 526/254, 206

[56] References Cited

U.S. PATENT DOCUMENTS

| | | | |
|---|---|---|---|
| 4,745,165 | 5/1988 | Arcella et al. | 526/206 |
| 4,774,302 | 9/1988 | Haruyoshi et al. | 526/206 |
| 4,948,852 | 8/1990 | Moore | 526/206 |
| 4,948,853 | 8/1990 | Logothetis | 526/206 |
| 4,973,633 | 11/1990 | Moore | 526/206 |
| 4,973,634 | 11/1990 | Logothetis | 526/206 |
| 5,032,655 | 7/1991 | Moore | 526/206 |
| 5,037,914 | 8/1991 | Monti | 526/206 |
| 5,041,508 | 8/1991 | Haruna et al. | 526/206 |
| 5,077,359 | 12/1991 | Moore | 526/206 |

FOREIGN PATENT DOCUMENTS 0211251  2/1987  European Pat. Off. ............ 526/206

Primary Examiner—Joseph L. Schofer
Assistant Examiner—N. Sarofim
Attorney, Agent, or Firm—Fred Philpitt

[57] ABSTRACT

A fluorine-containing elastomer capable of giving a primary vulcanization product with a good permanent set through peroxide vulcanization is produced by homopolymerization or copolymerization of a fluorine-containing olefin having 2 to 8 carbon atoms in the presence of an iodine and bromine-containing compound represented by the general formula RBrnIm, wherein R represents a fluorohydrocarbon group, a chlorofluorohydrocarbon group, a chlorohydrocarbon group or a hydrocarbon group, and n and m are integers of 1 and 2, and a small amount of perfluoro(unsaturated compound) which is iodotrifluoroethylene, perfluoro(bromoalkylvinylether) or perfluoro(iodoalkylvinylether).

5 Claims, No Drawings

PROCESS FOR PRODUCING PEROXIDE-VULCANIZABLE, FLUORINE-CONTAINING ELASTOMER

BACKGROUND OF THE INVENTION

1. Field of the Invention

This invention relates to a process for producing a peroxide-vulcanizable, fluorine-containing elastomer, and more particularly to a process for producing a fluorine-containing elastomer having those halogen atoms in the molecule which can act as cross-linking points for peroxide vulcanization.

2. Description of the Prior Art

Generally, vulcanized fluorine-containing elastomers have distinguished heat resistance, solvent resistance, weathering and ozone resistances, creep resistance, etc., and are commercially widely used as a sealing material for oil seal, packing material, gasket, O ring, etc., or as a diaphragm material, a hose lining material, a coating material, an adhesive, etc.

One of the conventional processes for obtaining such a vulcanized, fluorine-containing elastomer is based on a peroxide vulcanization method using an organic peroxide as a vulcanizing agent, where fluorine-containing elastomers having iodine atoms or bromine atoms as cross-linking points are used. Some of the examples will be given below, and they have the following problems.

Japanese Patent Application Kokai (Laid-open) No. 53-125,491 discloses a process using an iodine compound represented by the general formula $RfIx$, wherein Rf represents a fluorohydrocarbon group or a chlorofluorohydrocarbon group, but this iodine compound is expensive and highly toxic and readily liberates the iodine atoms bonded to the fluorine-containing elastomer, when exposed to light, as disclosed in the following Japanese Patent Application Kokai (Laid-open) No. 60-221,409.

Japanese Patent Application Kokai (Laid-open) No. 60-221,409, discloses a process using an iodine compound represented by the general formula $RI_{1-2}$, wherein R represents a hydrocarbon group having 1 to 3 carbon atoms, and this iodine compound is cheap and less toxic than the said compound represented by $RfIx$, but is poor in the vulcanization speed, and the heat resistance and compression set of the vulcanized products.

Japanese Patent Application Kokai (Laid-open) No. 59-20,310 discloses a process using a bromine compound represented by the general formula $RBrx$, wherein R represents a saturated aliphatic hydrocarbon group. Inventors of this prior art invention are partly common to those of the prior art invention disclosed in the said Japanese Patent Application Kokai (Laid-open) No. 53-125,491 and state that the fluorine-containing elastomers having bromine atoms are superior in the properties than the said fluorine-containing elastomers having iodine atoms. Indeed, the fluorine-containing elastomers having bromine have a better light stability, but are poor in the vulcanization speed and the heat resistance and compression set of the vulcanized products.

Japanese Patent Publication No. 54-1,585 discloses a process using a brominated olefin compound such as bromotrifluoroethylene, 4-bromo-3,3,4,4-tetrafluorobutene-1, etc., but the thus obtained fluorine-containing elastomers are liable to undergo gelation and are not only poor in the processability (flow characteristics), but also unsatisfactory in the elongation and compression set of the vulcanized products.

Japanese Patent Application Kokai (Laid-open) No. 60-195,113 discloses a process for copolymerizing not more than about 5% by mole, preferably 0.1 to 1.5% by mole, of a vinyl ether monomer acting as a curing site, represented by the general formula:

$$ROCX=CYZ$$

wherein one or two of X, Y and Z is selected from bromine and iodine atoms, the remainder being hydrogen, fluorine or chlorine atom, R is a linear or cyclic alkyl group, or alkenyl group or allyl group, but this prior art has the same disadvantages as in the art of the said Japanese Patent Publication No. 54-1,585.

As a result of extensive studies on a process for producing a peroxide-vulcanizable, fluorine-containing elastomer that can give a vulcanized product with distinguished processability, vulcanization characteristics and vulcanization physical properties, free from the problems encountered in the prior arts, the present inventors have previously found that the problems can be effectively solved by polymerizing a fluorine-containing olefin in the presence of an iodine and bromine-containing compound, thereby introducing and iodines and bromines into the fluorine-containing elastomer molecule as cross-linking points simultaneously (U.S. Pat. No. 4,748,223). Though the desired object was attained by the previous finding, the peroxide-vulcanized product of the fluorine-containing elastomer had a compression set of more than 30%, and thus a futher improvement of the permanent set has been still desired.

As a result of further investigation of a process capable of solving such a new problem, the present inventors found that the problem was effectively dissolved by conducting the polymerization reaction in the simultaneous presence of the iodine and bromine-containing compound and a small amount of 1,1-difluoro-2-bromoethylene, and the resulting copolymerization of the 1,1-difluoro-2-bromoethylene (U.S. Pat. No. 4,943,622).

Thus, the present inventors succeeded in considerable improvement of the compression set of the fluorine-containing elastomers by using the iodine and bromine-containing compound that deemed to act as a chain transfer agent together with 1,1-difluoro-2-bromoethylene.

SUMMARY OF THE INVENTION

An object of the present invention is to provide a process for producing a peroxide-vulcanizable, fluorine-containing elastomer, which can give a vulcanized product having a distinguished compression set even without the secondary vulcanization.

DETAILED DESCRIPTION OF THE PREFERRED EMBODIMENTS

These objects of the present invention can be attained by homopolymerizing or copolymerizing a fluorine-containing olefin having 2 to 8 carbon atoms in the presence of an iodine and bromine-containing compound represented by the general formula:

$$RBr_nI_m$$

wherein R is a fluorohydrocarbon group, a chlorofluorohydrocarbon group, a chlorohydrocarbon group or a hydrocarbon group, and n and m are integers of 1 and 2, and a small amount of perfluoro(unsaturated compound) selected from the group consisting of iodotrifluoroethylene, perfluoro(bromoalkylvinylether) and perfluoro(iodoalkylvinylether).

Among the perfluoro(unsaturated compounds) effective for copolymerization into the copolymer molecular chain and improving the physical properties of the fluorine-containing elastomer, perfluoro(bromoalkylvinylether) for use in the present invention includes, for example, perfluoro(2-bromoethylvinylether), perfluoro(2-bromopropylvinylether), perfluoro(3-bromopropylvinylether), perfluoro(4-bromobutylvinylether), perfluoro(4-bromo-2-methylbutylvinylether) etc. and the perfluoro(iodoalkylvinylether) for use in the present invention includes, for example, perfluoro(2-iodoethylvinylether), perfluoro(3-iodopropylvinylether), perfluoro(4-iodobutylvinylether), etc. Other iodoolefins for use in the present invention as a perfluoro(unsaturated compound) than iodotrifluoroethylene include, for example, iododifluoroethylene, iodoethylene, triallyl iodide, etc., but particularly preferable is iodotrifluoroethylene.

These perfluoro(unsaturated compounds) are used generally in an amount of about 0.001% to about 5% by mole, preferably about 0.01% to 3% by mole, on the basis of the fluorine-containing olefin. Below about 0.05% by mole, the effect on the improvement of the permanent set as aimed at in the present invention cannot be obtained, whereas above about 3% by mole the elongation of the vulcanized product is lowered.

The iodine and bromine-containing compound represented by the said general formula is selected from those which cannot lose the effects through side reactions under polymerization conditions, wherein R is selected from fluorohydrocarbon groups, chlorofluorohydrocarbon groups, chlorohydrocarbon groups or hydrocarbon groups generally having 1 to 10 carbon atoms, and each of the groups may have a functional group such as —O—, —S—, =NR, —COOH, —SO$_2$, —SO$_3$H, —PO$_3$H, etc.

Such iodine and bromine-containing compound may be a saturated or unsaturated linear or aromatic compound, wherein n and m each are preferably 1. The iodine and bromine-containing compound where at least one of n and m is 2 produces a fluorine-containing elastomer of three-dimensional structure, and thus is desirable to use within such a range as not to deteriorate the processability.

The linear iodine-containing bromine compound includes, for example, 1-bromo-2-iodoperfluoroethane, 1-bromo-3-iodoperfluoropropane, 1-bromo-4-iodoperfluorobutane, 2-bromo-3-iodoperfluorobutane, 1-bromo-2-iodoperfluoro(2-methylpropane), monobromomonoiodoperfluorocyclobutane, monobromomonoiodoperfluorpentane, monobromomonoiodoperfluoro-n-octane, monobromomonoiodoperfluorocyclohexane, 1-bromo-1-iodo-2-chloroperfluoroethane, 1-bromo-2-iodo-2-chloroperfluoroethane, 1-iodo-2-bromo-2-chloroperfluoroethane, 1,1-dibromo-2-iodoperfluoroethane, 1,2-dibromo-2-iodoperfluoroethane, 1,2-diiodo-2-bromoperfluoroethane, 1-bromo-2-iodo-1,2,2-trifluoroethane, 1-iodo-2-bromo-1,2,2-trifluoroethane, 1-bromo-2-iodo-1,1-difluoroethane, 1-iodo-2-bromo-1,1-difluoroethane, 1-bromo-2-iodo-1-fluoroethane, 1-iodo-2-bromo-1-fluoroethane, 1-bromo-2-iodo-1,1,3,3,3-pentafluoropropane, 1-iodo-2-bromo-1,1,3,3,3-pentafluoropropane, 1-bromo-2-iodo-3,3,4,4,4-pentafluorobutane, 1-iodo-2-bromo-3,3,4,4,4-pentafluorobutane, 1,4-dibromo-2-iodoperfluorobutane, 2,4-dibromo-1-iodoperfluorobutane, 1,4-diiodo-2-bromoperfluorobutane, 1,4-dibromo-2-iodo-3,3,4,4,-tetrafluorobutane, 1,4-diiodo-2-bromo-3,3,4,4-tetrafluorobutane, 1,1-dibromo-2,4-diiodoperfluorobutane, 1-bromo-2-iodo-1-chloroethane, 1-iodo-2-bromo-1-chloroethane, 1-bromo-2-iodo-2-chloroethane, 1-bromo-2-iodo-1,1-dichloroethane, 1,3-dibromo-2-iodoperfluoropropane, 2,3-dibromo-2-iodoperfluoropropane, 1,3-diiodo-2-bromoperfluoropropane, 1-bromo-2-iodoethane, 1-bromo-2-iodopropane, 1-iodo-2-bromopropane, 1-bromo-2-iodobutane, 1-iodo-2-bromobutane, 1-bromo-2-iodo-2-trifluoromethyl-3,3,3-trifluoropropane, 1-iodo-2-bromo-2-trifluoromethyl-3,3,3-trifluoropropane, 1-bromo-2-iodo-2-phenylperfluoroethane, 1-iodo-2-bromo-2-phenylperfluoroethane, 3-bromo-4-iodoperfluorobutene-1,3-iodo-4-bromoperfluorobutene-1,1-bromo-4-iodoperfluorobutene-1,1-iodo-4-bromoperfluorobutene-1,3-bromo-4-iodo-3,4,4-trifluorobutene-1,4-bromo-3-iodo-3,4,4trifluorobutene-1,3-bromo-4-iodo-1,1,2-trifluorobutene-1,4-bromo-5-iodoperfluoro-pentene-1,4-iodo-5-bromoperfluoro-pentene-1,4-bromo-5-iodo-1,1,2-trifluoropentene-1,4-iodo-5-bromo-1,1,2-trifluoropentene-1,1-bromo-2-iodoperfluoroethyl perfluoromethyl ether, 1-bromo-2-iodoperfluoroethyl perfluoroethyl ether, 1-bromo-2-iodo-perfluoroethyl perfluoropropyl ether, 2-bromo-3-iodoperfluoro-propyl perfluorovinyl ether, 1-bromo-2-iodoperfluoroethyl perfluorovinyl ether, 1-bromo-2-iodoperfluoroethyl perfluoro-allyl ether, 1-bromo-2-iodoperfluoroethyl methyl ether, 1-iodo-2-bromoperfluoroethyl methyl ether, 1-iodo-2-bromoethyl ethyl ether, 1-bromo-2-iodoethyl-2'-chloroethyl ether, etc. These iodine and bromine-containing compounds can be prepared according to an appropriate, known process; for example, a monobromomonoido, fluorine-containing olefin can be obtained by allowing a fluorine-containing olefin to react with iodine bromide.

The aromatic, iodine and bromine-containing compound includes, for example, benzenes having a substituent group such as 1-iodo-2-bromo, 1-iodo-3-bromo, 1-iodo-4-bromo, 3,5-dibromo-1-iodo, 3,5-diiodo-1-bromo, 1-(2-iodoethyl)-4-(2-bromoethyl), 1-(2-iodoethyl)-3-(2-bromoethyl), 1-(2-iodoethyl)-4-(2-bromoethyl), 3,5-bis(2-bromoethyl)-1-(2-iodoethyl), 3,5-bis(2-iodoethyl)-1-(2-bromoethyl), 1-(3-iodopropyl)-2-(3-bromopropyl), 1-(3-iodopropyl)-3-(3-bromopropyl), 1-(3-iodopropyl)-4-(3-bromopropyl), 3,5-bis(3-bromopropyl)-1-(3-iodopropyl), 1-(4-iodobutyl)-3-(4-bromobutyl), 1-(4-iodobutyl)-4-(4-bromobutyl), 3,5-bis(4-iodobutyl)-1-(4-bromobutyl), 1-(2-iodoethyl)-3-(3-bromopropyl), 1-(3-iodopropyl)-3-(4-bromobutyl), 3,5-bis(3-bromopropyl)-1-(2-iodoethyl), 1-iodo-3-(2-bromoethyl), 1-iodo-3(3-bromopropyl), 1,3-diiodo-5-(2-bromoethyl), 1,3-diiodo-5-(3-bromopropyl), 1-bromo-3-(2-iodoethyl), 1-bromo-3-(3-iodopropyl), 1,3-dibromo-5-(2-iodoethyl), 1,3-dibromo-5-(3-iodopropyl), etc., and perfluorobenzenes having a substituent group such as 1-iodo-2-bromo, 1-iodo-3-bromo, 1-iodo-4-bromo, 3,5-dibromo-1-iodo, 3,5-diiodo-1-bromo, etc.

During the polymerization reaction, the iodine and bromine of these iodine and bromine-containing compounds readily undergo radical cleavage under the action of an organic peroxide, radical-generating source, and the monomers undergo addition growth reaction owing to the high reactivity of the generated radicals, and then the reaction is discontinued by withdrawing the iodine and bromine from the iodine and bromine-containing compound to give a fluorine containing elastomer having iodine and bromine at the molecule terminals.

The iodine and bromine at the molecule terminals of the thus formed fluorine-containing elastomer readily undergo radical cleavage in the presence of a radical generating source, and the resulting polymer radicals have the similar reactivity. Thus, a segmented polymer corresponding to the species of polymerization monomers can be obtained by several runs of polymerization.

These iodine and bromine-containing compounds can generally give fluorine-containing elastomers capable of efficiently attaining cross-linking through bonding to the molecule terminals, and about 0.001 to about 5% by weight, preferably about 0.01 to about 3% by weight each of iodine and bromine must be contained in and bonded to in the resulting fluorine-containing elastomer. Below about 0.001% by weight, the cross-linking density of the fluorine-containing elastomer will be so low that no sufficient vulcanization can be obtained, whereas above 5% by weight, the rubber elasticity (elongation) and heat resistance of vulcanized product will become poor.

The fluorine-containing olefins for use in the polymerezaiton according to the present invention preferably have 2 to 8 carbon atoms, for example, at least one of vinylidene fluoride, tetrafluoroethylene, hexafluoropropene, pentafluoropropene, chlorotrifluoroethylene, perfluoro(methylvinylether), perfluoro(ethylvinylether), perfluoro(propylvinylether), and perfluoro(propoxypropylvinylether) can be used. Besides, vinyl fluoride, trifluoroethylene, perfluorocyclobutene, perfluoro(methylcyclopropene), hexafluoroisobutene, 1,2,2-trifluoro-styrene, perfluorostyrene, etc. can be also used.

These fluorine-containing olefins can be also copolymerized with at least one of olefinic compounds having 2 to 6 carbon atoms and fluorine-containing dienes having 4 to 8 carbon atoms.

The olefinic compound has 2 to 6 carbon atoms and includes, for example, olefins such as ethylene, propylene, butene; unsaturated vinyl esters such as vinyl acetate, and alkylvinylethers such as methylvinylether, ethylvinylether, and is generally copolymerized in a proportion of about 0.1 to about 50% by mole as contained in the fluorine-containing elastomer.

The fluorine-containing diene has 4 to 8 carbon atoms, and includes, for example, perfluoro-1,3-butadiene, perfluoro-1,4-pentadiene, 1,1,2-trifluoro-1,3-butadiene, 1,1,2-trifluoro-1,4-pentadiene, 1,1,2,3,3-pentafluoro-1,4-pentadiene, perfluoro-1,7-octadiene, perfluorodivinyl ether, perfluorovinyl perfluoroallyl ether, vinyl perfluoroallyl ether, perfluorovinyl vinyl ether, etc. It is preferable that the fluorine-containing diene is copolymerized in a proportion of not more than about 1% by mole, as contained in the fluorine-containing elastomer. When copolymerized in a proportion above about 1% by mole, the copolymer elastomer undergoes considerable gelation, deteriorating the processability (flow characteris-tics) and the elongation of the vulcanized products.

Specific examples of the fluorine-containing olefin copolymer include hexafluoropropene-vinylidene fluoride copolymer, hexafluoropropene-vinylidene fluoride-tetrafluoroethylene terpolymer, tetrafluoroethylene-vinylidene fluoride-perfluoro(methylvinylether) terpolymer, tetrafluoroethylenevinylidene fluoride-perfluoro(propylvinylether) terpolymer, tetrafluoroethylene-perfluoro(propoxypropylvinylether) copolymer, tetrafluoroethylene perfluoro(methylvinylether) copolymer, tetrafluoroethylene-propylene copolymer, tetrafluoro-ethylene-vinylidene fluoride-hexafluoropropene-pentafluoro-propene quaternary polymer, tetrafluoroethylene-hexafluoro-propene-vinyl fluoride-perfluoro(methylvinylether) quaternary polymer, tetrafluoroethylene-hexafluoropropene-hexafluoro-isobutene terpolymer, tetrafluoroethylene-cychohexyl vinyl ether copolymer, hexafluoropropene-vinylidene fluoride-chlorotrifluoroethylene terpolymer, vinylidene fluoride-tetrafluoroethylene-methyl perfluorovinyl ether terpolymer, vinylidene fluoride-tetrafluoroethylene-n-butyl perfluorovinyl ether terpolymer, vinylidene fluoride-methyl perfluorovinyl ether-perfluoro(methylvinylether) terpolymer, tetrafluoro-ethylene-methyl perfluorovinyl ether-perfluoro(methylvinyl ether) terpolymer, vinylidene fluoride-hexafluoropropene-tetrafluoroethylene-methyl perfluorovinyl ether quaternary copolymer, tetrafluoroethylene-n-butyl perfluorovinyl ether-perfluoro(methylvinylether) terpolymer, vinyliden fluoride-n-butyl perfluorovinyl ether copolymer, tetrafluoroethylene-propylene-n-butyl perfluorovinyl ether terpolymer, tetrafluoroethylene-vinylidene fluoride-propylene-n-butyl perfluorovinyl ether quaternary polymer, etc.

The polymerization reaction of the fluorine-containing olefin or the fluorine-containing olefin and the comonomer is carried out in the presence of an iodine and bromine-containing compound and perfluoro(unsaturated compound) according to a so far well known procedure through solution polymerization, suspension polymerization or emulsion polymerization.

In case of the solution polymerization, the polymerization reaction is carried out in a polymerization solvent of less chain transferability, such as perfluoro(1,2-dimethylcyclobutane), perfluoro(1,2-dichloroethane), perfluoro(1,2,2-trichloroethane), perfluorocyclohexane, perfluorotributylamine, $\alpha,\omega$-dihydroperfluoropolymethylene, perfluoro(methoxypolyethoxyethane), perfluorocyclobutane, tert-butanol, etc., using a polymerization initiator such as fluorine-containing organic peroxides, organic azo compounds, fluorine-containing organic azo compounds, etc. or these polymerization initiators as in a redox system in combination with a reducing agent, for example, an organo-metal compound such as triethylaluminum, triethylboron, diethylzinc, etc., a tertiary amine, mercaptanes, etc.

In case of the suspension polymerization, polymerization reaction is carried out while dispersing the monomer in water, using a polymerization initiator such as organic peroxides, fluorine-containing organic azo compounds, etc. (directly or in a solution in a solvent such as trifluorotrichloroethane, methyl chloroform, dichlorotetrafluoroethane, difluorotetrachloroethane, etc.) or these polymerization initiators as in a redox system in combination with a reducing agent, for example, an organometal compound such as triethylaluminum, triethylboron, diethylzinc, etc., a tertiary amine, mercaptane, etc.

In case of the emulsion polymerization reaction, a watersoluble polymerization initiator such as an inorganic peroxide, for example, persulfate, hydrogen peroxide, perchlorate, etc., and an organic peroxide such as tert-butyl hydroperoxide, disuccinyl peroxide, etc. is used. These polymerization initiators can be also used as a redox system using a reducing agent such as sulfite, hyposulfite, ascorbic acid, ferrous salts, sodium hydroxymethanosulfinate, etc. together.

The molecular weight of the fluorine-containing elastomer can be adjusted with a chain transfer agent such as methanol, ethanol, isopentane, ethyl acetate, dietyl malonate, carbon trtrachloride, etc. Furthermore, in order to attain the stable dispersion of polymer particles in a polymerization solution, as increase in the polymer concentration, prevention of polymers from deposition onto the polymerization reactor wall, etc., an emulsifier such as fluorine-containing carboxylates, fluorine-containing sulfonates, etc. can be also used.

These various types of polymerization reaction are carried out in such a temperature that no depolymerization of the thus formed polymer takes place as a result of progress of radical reaction, generally at a temperature of $-30°$ to $150°$ C. However, in case of the redox system, the polymerization reaction takes place at a temperature of $0°$ to $50°$ C. By carrying the polymerization reaction in such a range of low temperature, thermal decomposition of the iodine and bromine-containing compound can be suppressed, and the cross-linking density of the vulcanized product can be increased.

The polymerization pressure is not particularly limited, and a broad pressure range can be used in accordance with desired rate and degree of polymerization, but generally the polymerization is carried out in a range of about 1 to about 100 $kgf/cm^2$.

The fluorine-containing elastomer obtained according to the present invention can be cured according to various known vulcanization methods, for example, by peroxide vulcanization using an organic peroxide, by polyamine vulcanization using a polyamine compound, by polyol vulcanization using a polyhydroxy compound, or by irradiation of radiations, electron beams, etc. Above all, the elastomer cured by peroxide vulcanization can have a higher mechanical strength and a carbon-carbon bonds of stable structure at the cross-linking points. That is, the peroxide vulcanization can give vulcanized products having distinguished chemical resistance, solvent resistance, etc. and thus is particularly preferable.

The organic peroxide for use in the peroxide vulcanization includes, for example, 2,5-dimethyl-2,5-bis(tert-butylperoxy)hexane, 2,5-dimethyl-2,5-bis(tert-butyl-peroxy)hexine-3, benzoyl peroxide, bis(2,4-dichloro-benzoyl) peroxide, dicumyl peroxide, di-tert-butyl peroxide, tert-butyl cumyl peroxide, tert-butylperoxybenzene, 1,1-bis(tert-butylperoxy)3,5,5-trimethyl cyclohexane, 2,5-dimetylhexane-2,5-dihydroxyperoxide, $\alpha$, $\omega'$-bis(tert-butylperoxy)-p-diisopropylbenzene, 2,5-dimethyl-2,5-di(benzoylperoxy)hexane, tert-butylperoxy isopropyl carbonate etc.

In the peroxide vulcanization using the organic peroxide, a polyfunctional, unsaturated compound, such as tri(meth)allyl isocyanulate, tri(meth)allyl cyanulate, triallyl trimellitate, N,N'-m-phenylene bismaleimide, diallyl phthalate, tris(diallylamine)-s-triazine, triallyl phosphite, 1,2-polybutadiene, ethyleneglycol diacrylate, diethyleneglycol diacrylate, etc. can be usually used as a co-cross-linking agent to obtain more distinguished vulcanization characteristics, mechanical strength and compression set.

An oxide or hydroxide of divalent metal, such as oxides or hydroxides of calcium, mangnesium, lead, zinc, etc. can be used as a cross-linking aid, depending upon the desired purpose. These compounds also act as acid acceptor.

The foregoing components for the peroxide vulcanization system are used in the following proportion. About 0.1 to about 10 parts by weight, preferably about 0.5 to about 5 parts by weight, of the organic peroxide; about 0.1 to about 10 parts by weight, preferably about 0.5 to about 5 parts by weight, of the co-crosslinking agent; and not more than about 15 parts by weight of the crosslinking aid are used on the basis of 100 parts by weight of the fluorine-containing elastomer.

The foregoing components for the peroxide vulcanization can be blended and kneaded into the fluorine-containing elastomer directly as such or after diluted with carbon black, silica, clay, talc, diatomaceous earth, barium sulfate, etc., or as a master dispersion with the fluorine-containing elastomer. In addition to the foregoing components, so far well known filler, reinforcing agent, plasticize lubricant, processing aid, pigment, etc. can be appropriately added to the blend.

The present fluorine-containing elastomer can be also blended and co-crosslinked with other peroxide-crosslinking substances such as silicone oil, silicone rubber, fluorosilicone rubber, fluorophospahzene rubber, ethylene-vinyl acetate copolymer, ethylene-acrylate copolymer, ethylenepropylene(-diene) copolymer rubber, acrylonitrile-butadiene copolymer rubber, acrylate rubber, etc.

Vulcanization can be carried out by heating after the said components have been blended according to an ordinary blending method, for example, by roll mixing, by kneader mixing, by Banbury mixing, by solution mixing, etc. The heating is carried out generally in two steps or one step, i.e. by primary vulcanization at about $100°$ to about $250°$ C. for about 1 to about 120 minutes and by secondary vulcanization at about $150°$ to about $300°$ C. for 0 to 30 hours.

The fluorine-containing elastomer obtained according to the present process can give a vulcanization product distinguished in the compression set and the normal state physical properties even by primary vulcanization. Particularly, the compression set of the primary vulcanization product is remarkable improved, as compared with that obtained with 1,1-difluoro-2-bromoethylene.

PREFERRED EMBODIMENTS OF THE INVENTION

The present invention will be described in detail below, referring to Examples.

COMPARATIVE EXAMPLE 1

1,500 ml of deionized water and 7.5 g of ammonium perfluoroctoate were charged into an autoclave with a net capacity of 3 liters and the inside space of the autoclave was throughly flushed with a nitrogen gas. Then, a gas mixture of vinylidene fluoride, hexafluoropropene and tetrafluoro-ethylene in a molar ratio of 35:45:20 was introduced under pressure into the autoclave until the inside pressure reached 12 $kg/cm^2$ gauge. Then, 2.9 g (about 0.1% by mole on the basis of the fluorine-containing olefins) of 1-bromo-2-iodoperfluoroethane and 2.2 g (about 0.1% by mole on the basis of the fluorine-containing olefins) of 1,1-difluoro-2-bromoethylene were introduced under pressure into the autoclave, and the inside temperature was increased to $50°$ C.

Then, 3.5 g of ammonium persulfate, 0.4 g of ferrous sulfate.$7H_2O$ and 1.0 g of sodium sulfite, each dissolved in deionized water, were introduced under pressure into the autoclave, and a gas mixture of vinylidene fluoride, hexafluoropropene and tetrafluoroethylene in a molar ratio of 52:27:21 was introduced under pressure into the autoclave until the inside pressure reached 16 kg/cm² gauge, and polymerization reaction was started.

As soon as the reaction started, the inside pressure was lowered, and thus when the inside pressure was lowered to 15 kg/cm² gauge, the latter gas mixture was introduced again under pressure into the autoclave to increase the inside pressure to 16 kg/cm² gauge again. The polymerization reaction was continued while maintaining the inside pressure at 15 to 16 kg/cm² gauge in this manner, and 2 hours after the start of the reaction, the unreacted gas mixture was purged from the autoclave to discontinue the reaction.

An aqueous 5% potassium alum solution was added to the resulting aqueous emulsion to coagulate the resulting polymer. The coagulated polymer was washed with water and dried, whereby 429 g of rubber-like copolymer was obtained.

COMPARATIVE EXAMPLE 2

2.5 g (about 0.1 mole %) of bromotrifluoroethylene was used in place of 1,1-difluoro-2-bromoethylene in Comparative Example 1 to obtain 408 g of rubbery copolymers.

EXAMPLE 1

3.2 g (about 0.1 mole %) of iodotrifluoroethylene was used in place of 1,1-difluoro-2-bromoethylene in Comparative Example 1 to obtain 412 g of rubbery copolymers.

EXAMPLE 2

4.3 g (about 0.1 mole %) of perfluoro(2-bromoethylvinylether) was used in place of 1,1-difluoro-2-bromoethylene in Comparative Example 1 to obtain 412 g of rubbery copolymers.

EXAMPLE 3

5.0 g (about 0.1 mole %) of perfluoro(2-iodoethylvinylether) was used in place of 1,1-difluoro-2-bromoethylene in Comparative Example 1 to obtain 398 g of rubbery copolymers.

20 parts by weight of MT carbon black, 3 parts by weight of 2,5-dimethyl-2,5-di(t-butylperoxy)hexane (concentration: 40%), 3 parts by weight of lead oxide and 4 parts by weight of triallylisocyanurate were roll kneaded into 100 parts by weight each of the fluorine-containing elastomers obtained in the foregoing Examples and Comparative Examples. It was found that all of the resulting kneaded products had good processabilities including the kneadability, flow characteristics, etc.

The resulting kneaded products were subjected to primary vulcanization by press vulcanization at 180° C. for 10 minutes and then to secondary vulcanization by oven vulcanization at 220° C. for 22 hours to obtain sheet-form and O-ring-form vulcanization products. As to the O-ring-form vulcanization products, primary vulcanization products were also molded by omitting the secondary vulcanization.

The individual vulcanization products were subjected to measurements of normal state physical properties, etc. according to the following procedures. The results are shown in the following TABLE 1 together with molar ratio (by ¹⁹F-NMR) comonomer compositions of fluorine-containing elastomers used.

Measurement procedures

Normal state physical properties: according to JIS K-6301.

Compression set: 25% compression products of P-24 O-rings having a wire diameter of 3.5 mm at 200° C. for 70 hours were subjected to the measurement.

TABLE 1

|  | Comp. Ex. No. | | Example No. | | |
|---|---|---|---|---|---|
|  | 1 | 2 | 1 | 2 | 3 |
| [Molar ratio of comonomer composition] | | | | | |
| Vinylidene fluoride | 54 | 55 | 53 | 54 | 54 |
| Hexafluoropropene | 20 | 20 | 20 | 20 | 21 |
| Tetrafluoroethylene | 26 | 25 | 27 | 26 | 25 |
| [Normal state physical properties] | | | | | |
| Hardness (JIS-A) | 72 | 73 | 74 | 72 | 72 |
| 100% modulus (kgf/cm²) | 51 | 48 | 55 | 60 | 63 |
| Tensile strength (kgf/cm²) | 254 | 192 | 187 | 245 | 252 |
| Elongation (%) | 349 | 276 | 245 | 303 | 312 |
| [Compression set] | | | | | |
| Primary vulcanization product (%) | 37 | 43 | 35 | 28 | 27 |
| Secondary vulcanization product (%) | 26 | 28 | 28 | 24 | 24 |

COMPARATIVE EXAMPLE 3

1,500 ml of deionized water and 7.5 g of ammonium perfluorooctanoate were charged into an autoclave having a net capacity of 3 liters, and 5 g of disodium phosphate dodecahydrate and 5 g of sodium hydroxide dissolved in 20 ml of deionized water was added thereto to adjust pH to about 10.

Then, an aqueous solution containing 1 g of ammonium persulfate in 10 ml of deionized water was added thereto. The gas in the inside space of the autoclave was thoroughly replaced with a nitrogen gas, and the autoclave was thoroughly cooled. Then, 350 g of a gas mixture of vinylidene fluoride/tetrafluoroethylene/perfluoro(methylvinylether) at a molar ratio of 72/8/20, 0.57 g (about 0.1 mole %) of 1,1-difluoro-2-bromoethylene and 1.23 g (about 0.1 mole %) of 1-bromo-2-iodoperfluoroethane were each charged therein. The autoclave was heated to 50° C. with stirring, whereby the inside pressure of the autoclave reached 28 kg/cm² gauge.

At the same time when the reaction proceeded, the pressure was lowered. When the inside pressure was lowered to 1 kg/cm² gauge, 24 hours after the start of the reaction, the autoclave was cooled and the residual gas was purged therefrom to discontinue the polymerization reaction. An aqueous 18% sodium chloride solution was added to the resulting aqueous emulsion to coagulate the resulting polymer. By successive water washing and drying, 332 g of rubbery copolymers were obtained.

EXAMPLE 4

1.10 g (about 0.1 mole %) of perfluoro(2-bromoethylvinylether) was used in place of 1,1-difluoro-2-bromoethylene in Comparative Example 3 to obtain 330 g of rubbery copolymers.

Molar ratio of comonomer compositions of the fluorine-containing elastomers obtained in the foregoing Example 4 and Comparative Example 3, results of measurement of the normal state physical properties of vulcanization products obtained in the same manner as before, and the compression sets of the primary and secondary vulcanization products are shown in the following TABLE 2.

TABLE 2

|  | Comp. Ex. No. 3 | Ex. No. 4 |
| --- | --- | --- |
| [Molar ratio of comonomer composition] | | |
| Vinylidene fluoride | 70 | 71 |
| Tetrafluoroethylene | 8 | 10 |
| Perfluoro (methylvinylether) | 22 | 19 |
| [Normal state physical properties] | | |
| Hardness (JIS-A) | 69 | 66 |
| 100% modulus (kgf/cm$^2$) | 26 | 52 |
| Tensile strength (kgf/cm$^2$) | 189 | 202 |
| Elongation (%) | 382 | 314 |
| [Compression set] | | |
| Primary vulcanization product (%) | 41 | 27 |
| Secondary vulcanization product (%) | 27 | 26 |

What is claimed is:

1. A process for producing a peroxide-vulcanizable, fluorine-containing elastomer, which comprises homopolymerizing or copolymerizing a fluorine-containing olefin having 2 to 8 carbon atoms in the presence of an iodine and bromine-containing compound represented by the general formula:

RBr$_n$I$_m$ wherein R is a fluorohydrocarbon group, a chlorofluorohydrocarbon group, a chlorohydrocarbon group or a hydrocarbon group, and n and m are integers of 1 and 2, and perfluoro-(unsaturated compound) selected from the group consisting of perfluoro(bromoalkylvinylether) and perfluoro(iodoalkylvinylether).

2. A process according to claim 1, wherein the iodine and bromine-containing compound is used in an amount of about 0.001% to about 5% by weight in terms of iodine and bromine to be combined in the fluorine-containing elastomer.

3. A process according to claim 1, wherein the perfluoro-(unsaturated compound) is used in a ratio about 0.001% to about 5% by mole to the fluorine-containing olefin.

4. A process according to claim 1, wherein the homopolymerizing or copolymerizing is carried out at a temperature of about −30° C. to about 150° C. in the presence of a polymerization initiator.

5. A process according to claim 1, wherein the homopolymerizing or copolymerizing is carried out at a temperature of about 0° C. to about 50° C. in the presence of a Redox polymerization initiator.

* * * * *